2,835,700
PROCESS OF HALOGENATING ORGANIC COMPOUNDS

Albert J. Boyle, Detroit, Mich., and Albert Zlatkis, Houston, Tex., assignors to Basic, Incorporated, a corporation of Ohio No Drawing. Application February 25, 1954
Serial No. 412,620

1 Claim. (Cl. 260—519)

Various methods of halogenating organic compounds have been suggested or are in use, and involving various halogenating reagents. A difficulty which has persisted in many cases is loss of materials, and the obtaining of lower yields than are desirable. Also, in some instances a high degree of criticality has been incurred. In accordance with the present invention, halogenation may be accomplished in a manner which is relatively simple and which results in satisfactory yields and particularly pure products. In certain cases the method appears to influence certain unique orientation features. For instance, in the chlorination of toluene, more orthochlorotoluene is produced than parachlorotoluene, whereas in the chlorination of toluene by other processes the parachlorotoluene is the chief product. Other objects and advantages will appear from the following description.

To the accomplishment of the foregoing and related ends, said invention, then, comprises the features hereinafter fully described and particularly pointed out in the claim, the following description setting forth in detail certain illustrative embodiments of the invention, these being indicative, however, of but a few of the various ways in which the principle of the invention may be employed.

In general, the present process involves halogenating acceptor compounds by reaction to formation of a halogen compound thereof plus by-product water, by treating with a reaction medium containing a pentavalent halogen of higher atomic weight than fluorine, in acid medium providing in addition halide, and hydrogen ions. Halogenation proceeds by this process uniformly, and in many instances even though the organic compound to be halogenated is only partially soluble in the solvent phase containing the other ingredients. To a mechanically agitated mixture of solvent, usually water, the organic compound to be halogenated, and an acid furnishing hydrogen ions and a halide, the oxyhalide salt or oxyhalide acid is added. Thus, with a mixture for instance of water and the organic compound to be halogenated, a suitable amount of an acid, a source of halide, and a small amount of a catalyst, such as for instance, a soluble iron salt furnishing ferric or ferrous ions, e. g., $FeCl_3$, $FeSO_4$, $Fe(NO_3)_3$, $FeOH(C_2H_3O_2)_2$, etc., 100 to 300 milligrams per liter, the oxyhalide or oxyhalide acid is added, the mixture being thoroughly agitated, and the temperature controlled. The halogenated product is obtained in good yield for instance by a single distillation or recrystallization of the crude product.

A variation is the use of the oxyhalide as acid or salt present in full amount with the organic compound to be halogenated, water, mineral or organic acid and catalyst. To this agitated mixture at properly controlled temperature a halide or acid of the halide is added slowly and uniformly to the reaction mixture.

The present process is effective in the halogenation of carbon chain compounds having directional groups, that is aromatic, heterocyclic, aliphatic and alicyclic compounds which possess functional groups which are of a directional or determinative nature in halogenation or other reactions. Such directional groups are alkyl, carboxyl, hydroxyl, amino, substituted amino, phenoxy, and aliphatic ethers. Such various compounds are typified by: toluene, xylene, mesitylene, benzoic acid, salicylic acid, beta-resorcylic acid, 1-4 benzoquinone, resorcinol, methyl phenyl ether, ethyl phenyl ether, resorcinol dimethyl ether, diphenyl ether, 8-hydroxyquinoline, anthranilic acid, 1-tyrosine, stearic acid and cyclohexanol.

As oxyhalide salt or oxyhalide acid, depending upon the particular halogenation to be accomplished, whether chlorination, bromination or iodination, there may be employed an oxyacid of the halogen or an oxyhalide salt, such as oxychloride, an oxybromide, or an oxyiodide in which the halogen is in the pentavalent state. As oxyhalide salts, those of the group consisting of alkali and alkaline earth metals are applicable. It is also possible to halogenate with an oxyhalide whose halogen is not represented in the final halogenated organic compound or product. Thus chlorination, for example, may be accomplished by the slow and uniform addition of an iodate or iodic acid to an agitated mixture at properly controlled temperature containing the organic compound to be chlorinated, water, a source of hydrogen ion, chloride salt or hydrochloric acid, and 100 to 300 mg. of iron salt per liter of reaction mixture.

The method of introducing the oxyhalide becomes an important factor in dealing with the halogenating reactions. For instance, in chlorination reactions it is necessary to add the oxyhalide slowly from the outside to the other reactants, especially when temperatures above 60° C. are employed. This is also true in bromination reactions using bromates. It may be generally stated that in the event the oxyhalide is unstable by itself due to temperature or excessive acidity or a combination of both or in the presence of reactants before all ingredients are introduced (except halide salt or halide acid) it is best added from the outside slowly and uniformly to all the other ingredients of the reaction. In general, the range of operative temperatures is 0° C. to just below 100° C. The optimum temperature of reaction is somewhat dependent in each case on the nature of the organic compound being halogenated and the halogenating agents or both. For example, the bromination of toluene requires a temperature in the neighborhood of 20° C.; the iodination of tyrosine a temperature of approximately 45° C. and the iodination of toluene a temperature of 90° C. In other words, wasteful decomposition of the halogenating agents due to temperature or undesirable decomposition or alteration of the organic material before, during or after halogenation is to be avoided.

The acid to supply the hydrogen ions is usually hydrochloric acid or sulphuric acid or phosphoric acid, although in the case of rather easily decomposed organic compounds to be halogenated, a weaker acid, such as acetic acid or the previously mentioned mineral acids in reduced concentration are preferred. Depending upon the nature of the compound being halogenated and the halogen being introduced into the molecule, the range of initial acid concentration varies in the instance of hydrochloric acid between 7 and 37% HCl by weight, in that of sulphuric acid between 5 and 40% $H_2SO_4$ by weight, and in that of acetic acid between 5 and 30% $CH_3$—COOH by weight. During the course of the reaction, the formation of water reduces the concentration slightly. Other organic acids, such as formic are too reactive with the halogenating agents to be used as a source of hydrogen ions.

In the case of iodination the present process has very important advantages over the practice heretofore. Primarily, the process is a simple one-step reaction using readily available starting materials; and secondly, the products obtained are relatively pure, requiring only one crystallization. Finally, and very important from the practical economical point of view, essentially all of the iodine liberated is used to iodinate the compound.

For chlorination then, a chlorate ion, e. g., chloric acid or sodium chlorate, is added slowly and uniformly to the mixture of the solvent, the organic compound to be chlorinated, hydrochloric acid, and a small amount of iron salt as aforementioned, the temperature for the reaction being maintained below boiling point, such as 60 to 90° C. In brominating, to a mixture of solvent, e. g., water, the organic compound to be brominated, bromic acid or a bromate salt, sulphuric acid in suitable amount, and a small amount of iron salt as aforementioned, there is added slowly a bromide salt, which may be in water solution. Above a temperature of 40° C. a bromate may be added from the outside to a mixture of bromide salt, water, acid, catalyst, and organic compound to be brominated. In the case of iodination, again a mixture of solvent, the organic compound to be iodinated, iodic acid or an iodate, an acid and a small amount of iron salt as afore-mentioned, is mechanically agitated and heated to a temperature range as aforestated, and an iodide salt is added, in water solution.

The following examples are illustrative (the equations written considering the oxyhalide and halides as acid):

I. Add together in a 1000 ml. Pyrex flask equipped with condenser, stirrer and dropping funnel 92 grams (1 mol) of toluene, 100 ml. of concentrated HCl, a small amount of iron salt, e. g., 100 mg. and 50 ml. of water. Agitate the mixture vigorously and heat to 70° C. Add dropwise to the agitated mixture a solution consisting of 48 grams of sodium chlorate and 125 ml. of water. The crude product of chlorotoluene is easily separated from the reaction mixture and may be distilled at 157–162° C. It is to be noted that in this type reaction the oxyhalide is added to the other substances during the course of the reaction. A general reaction is:

$$3CH_3C_6H_5 + HClO_3 + 2HCl \rightarrow 3CH_3C_6H_4Cl + 3H_2O$$

II. Add together in a 1 liter Pyrex flask equipped with condenser, stirrer and dropping funnel, 92 grams (1 mol) of toluene, 53 grams (0.35 mol) sodium bromate, 200 ml. of water containing 80 ml. of concentrated sulphuric acid which has been cooled to room temperature and a small amount of iron salt as foregoing. Agitate the mixture vigorously and add dropwise to the reaction flask at room temperature a solution consisting of 72 grams (0.7 mol) sodium bromide in 125 ml. of water. In order to maintain the temperature of the reaction between 20 and 30° C. it may be necessary to use an ice bath. In the course of two or three hours the bromide salt is added dropwise as described. The agitated mixture is then raised slowly to 85° C. and permitted to remain there for one-half hour. The crude bromotoluene is easily separated from the mixture, cooled and washed twice in a separatory funnel with cold 1% sodium hydroxide. It is then distilled under vacuum at 38° C. and 1.5 mm. Hg pressure. The yield obtained (bromotoluene) is approximately 50%. It is noticed that in this example all of the oxyhalide is present in the heated mixture to which the bromide is added slowly throughout the course of the reaction. In the presence of sufficient acid, the reaction may be represented as follows:

$$3CH_3C_6H_5 + HBrO_3 + 2HBr \rightarrow 3CH_3C_6H_4Br + 3H_2O$$

III. Add together in a 1000 ml. Pyrex flask equipped with condenser, stirrer and dropping funnel 92 grams (1 mol) of toluene, 66 grams (0.33 mol) sodium iodate, 300 ml. $H_2O$, 80 ml. concentrated $H_2SO_4$ and a small amount of iron salt. Agitate the mixture vigorously and heat to 90° C. Add dropwise to the agitated mixture a solution consisting of 100 grams (0.66 mol) of sodium iodide and 100 ml. of water. The crude product, iodotoluene, is easily separated from the reaction mixture and may be distilled under vacuum, 55–56° C./0.75 mm. Hg. It is to be noted in this type reaction the oxyhalide is present in full amount in the reacting mixture to which iodide is added dropwise during the course of the reaction. The reaction may be represented as:

$$3CH_3C_6H_5 + HIO_3 + 2HI \rightarrow 3CH_3C_6H_4I + 3H_2O$$

IV. A mixture containing 27 grams (0.149 mol) of l-tyrosine and 500 ml. of 15% acetic acid is heated to 45° C. (somewhat higher or lower temperatures may be employed). The mixture is mechanically agitated while a dropwise addition of a water solution containing 25 grams (0.126 mole) of $NaIO_3$ and 33 grams (0.22 mole) of NaI is made. A reaction time of three quarters of an hour is usually required for the above system and the product, usually straw yellow, is obtained in yields of 80–90%. Recrystallization from 10% acetic acid (charcoal) yields a product decomposing between 191–195° C. Vacuum drying this product for several hours at 100° C. yields a product which decomposed between 202–204° C. The reaction may be represented as follows:

$$3HOC_6H_4CH_2CH(NH_2)COOH + 4HI + 2HIO_3 \rightarrow$$
$$3HOC_6H_2I_2CH_2CH(NH_2)COOH + 6H_2O$$

A 80–90% yield of 3,5-diiodo-l-tyrosine may be isolated. It is noticed that at no time is the tyrosine or iodinated product completely in solution. Complete solubility of the organic molecule to be halogenated is not necessary for a successful reaction. All of the iodine liberated goes into iodinating the compound. The oxyiodide salt immediately oxidizes any hydrogen iodide formed, thereby preventing any de-iodination.

Other modes of applying the principle of the invention may be employed, change being made as regards the details described, provided the features stated in the following claim or the equivalent of such be employed.

We therefore particularly point out and distinctly claim as our invention:

The method of making iodo-tyrosine which comprises agitating a mixture of l-tyrosine and acetic acid at a temperature of approximately 45° C., gradually adding to such mixture while thus agitated a water solution of sodium iodate and iodide, and then separating the resulting 3,5-diiodo-l-tyrosine from the reacting mixture.

References Cited in the file of this patent

UNITED STATES PATENTS

| 1,741,305 | Jaeger | Dec. 31, 1929 |
| 2,417,027 | Weinmayer | Mar. 4, 1947 |
| 2,535,131 | Gubelmann | Dec. 26, 1950 |

OTHER REFERENCES

Groggins: Unit Processes in Organic Synthesis, fourth edition, pages 177 and 214–218 (1952).